United States Patent Office 2,697,698
Patented Dec. 21, 1954

2,697,698

SOLUTIONS OF ACRYLONITRILE POLYMERS IN NITROSAMINES

Ernest Jan Kowolik, John Downing, and James Gordon Napier Drewitt, Spondon, near Derby, England, assignors to British Celanese Limited, a corporation of Great Britain No Drawing. Application May 15, 1952, Serial No. 288,056

Claims priority, application Great Britain May 23, 1951

1 Claim. (Cl. 260—30.2)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; vinyl compounds containing basic nitrogen, e. g. 2-vinyl-pyridine, 2-methyl-5-vinyl-pyridine, and morpholino-ethyl vinyl ether; and vinylidene chloride. Polyacrylonitrile itself and such copolymers of acrylonitrile with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acrylonitrile polymers can be dissolved in solvents comprising certain nitrosamines which are substantially stable at temperatures up to 120° C., and which contain more than two carbon atoms in the molecule. Preferably the nitrosamine is the sole constituent of the solvent, but it may if desired be used in association with another compound or compounds, as more fully described below. The nitrosamines in question are: (a) Compounds in which the ratio of the number of nitrosamino groups to the number of carbon atoms in the molecule is not lower than 1:3, (b) Compounds in which the said ratio is lower than 1:3 but not lower than 1:4, and in which the amino nitrogen atom of a nitrosamino group forms part of a saturated or unsaturated ring, (c) Compounds in which the said ratio is not lower than 1:6, and preferably not lower than 1:4, and which contain, besides the nitrosamino group or groups, an "auxiliary solvogenic group" or groups (as defined below), the ratio of the total number of nitrosamino and auxiliary solvogenic groups to the number of carbon atoms not forming part of an auxiliary solvogenic group being not lower than 1:3, and (d) Compounds in which the ratio of the number of nitrosamino groups is not lower than 1:6, preferably not lower than 1:5, and the amino nitrogen atom of a nitrosamino group forms part of a saturated or unsaturated ring, and which contain one or more auxiliary solvogenic groups, the ratio of the total number of nitrosamino and auxiliary solvogenic groups to the number of carbon atoms not forming part of an auxiliary solvogenic group being below 1:3 but not below 1:4.

The term "auxiliary solvogenic group" is employed in this specification to denote a single atom in a given position or a combination of atoms, which when occurring in the carbon framework of an organic compound tends to promote solvent power for polyacrylonitrile. Examples of such groups will be found set out in a paper by R. C. Houtz (Textile Research Journal 20, 786–801). The auxiliary solvogenic groups which have been found to be most effective when they occur in nitrosamines are oxygen, sulphur and nitrogen as ring atoms, more especially as members of a ring of which the amino nitrogen atom of a nitrosamino group also forms part, nitrile groups attached to carbon carrying at least one hydrogen atom, amide groups (which may be N-substituted), carbonyl groups, especially as part of a ring, and nitro groups.

Examples of nitrosamines that can be employed are N-nitroso - trimethylene - imine, 1-nitroso-$\Delta^3$-pyrroline, NN'-dinitroso-NN'-dialkyl-alkylene diamines containing not more than 6 carbon atoms in the molecule, e. g. NN'-dinitroso-NN'-dimethyl-ethylene diamine, NN'-dinitroso-NN'-dimethyl-trimethylene diamine, NN'-dinitroso-NN'-dimethyl-tetramethylene diamine and NN'-dinitroso-NN'-diethylethylene diamine (all obtainable by the action of nitrous acid on the corresponding secondary diamine), N-nitroso-N-ethyl-amino-acetonitrile (obtainable by the action of nitrous acid on N-ethyl-amino-acetonitrile), nitroso-imino-diacetonitrile, N-nitroso-N-butyl-urea, N-nitroso - $\alpha$ - pyrazolidone, 1-nitroso-3-nitro-pyridine (obtainable by the action of nitrous acid on 3-nitro-pyridine), 2-nitroso-1-ethyl - 3 - methyl - pyrazolidone-5, N-nitroso-morpholine, N-nitroso-thiomorpholine (obtainable by the action of nitrous acid on thiomorpholine). Such of these compounds as are not liquids at ordinary temperatures have melting points below about 100° C. Nitrosamines of higher melting point, which may be regarded as solvent plasticisers, include N - nitroso-N-ethyl-aminoacetamide (obtainable by the action of nitrous acid on N-ethyl-amino-acetamide), nitroso-imino-diacetamide, 3-nitroso-2,5-bis-methylimino-1,3,4-thiodiazolidine, and dinitroso-piperazine.

Furthermore, nitrosamines in which the amino nitrogen atom of a nitrosamino group is not part of a ring structure and in which the ratio of nitrosamino groups to carbon atoms, or the ratio of nitrosamino groups and auxiliary solvogenic groups together to carbon atoms not contained in auxiliary solvogenic groups, is lower than 1:3 but not lower than 1:4, and compounds which contain a nitrosamino group of which the amino nitrogen atom forms part of a ring structure and in which these ratios are lower than 1:4 but not lower than 1:5, have the power of swelling acrylonitrile polymers, especially at elevated temperatures. Examples of such nitrosamines are 3 - nitroso-4,6,6-trimethyl-2-ethyl-tetrahydro-1,3-oxazine, 3-nitroso-4,4,6-trimethyl-2-isopropyl-tetrahydro-1,3-oxazine, 2,3 - bis(ethylnitrosamino)butane, 2,2' - bis - $\alpha$-pyridyl - diethylamine, and N-nitroso-bis-2-nitrobenzyl-amine.

For the sake of brevity the invention will be more particularly described by reference to the production and use of solutions of a fibre-forming polyacrylonitrile. It will however be understood that the invention includes the production and use of solutions of other acrylonitrile polymers, especially such fibre-forming copolymers of acrylonitrile and other unsaturated compounds as are insoluble in acetone. Examples of such copolymers are copolymers containing 85% or more of acrylonitrile and 15% or less of vinyl chloride, 60% or more of acrylonitrile and 40% or less of methacrylonitrile, or 90% or more of acrylonitrile and 10% or less of 2-methyl-5-vinyl-pyridine or morpholino-ethyl vinyl ether.

Compositions comprising polyacrylonitrile and a solvent nitrosamine of one of the classes indicated above may be obtained by stirring, milling or otherwise working a mixture of the polymer and the nitrosamine at a temperature which is preferably above, or not much below, the normal melting point of the nitrosamine and is in any case above 80° C. and preferably above 110° C. When it is desired to obtain a composition suitable for conversion into fibres by a wet-spinning method, a nitrosamine of melting point below about 100° C., and advantageously below about 60° C., is preferably used; on the other hand, when a composition suitable for melt-spinning is required, the nitrosamine may have a higher melting point. Compositions comprising swollen polyacrylonitrile may be obtained by stirring, milling or otherwise working the polymer at temperatures of about 80°–180° C. with a nitrosamine having only a swelling action at these temperatures, and stable at the temperature employed.

As already stated, in the preferred embodiment of the invention the nitrosamines are employed in a substantially undiluted condition. If desired however they may be employed in association with other compounds, which may themselves be solvents or swelling agents for polyacrylonitrile or may be substantially without such action, but which are chemically inert, for practical purposes, towards the nitrosamine under the conditions employed. Examples of substances having a solvent or swelling action on polyacrylonitrile are di-methyl formamide, sulpholane, lactones such as butyro-lactone and the valero-lactones, maleic acid and anhydride, succinic and glutaric anhydrides, nitromethane, dihydric phenols such as resorcinol and catechol, cyclic ethylene glycol carbonate and other cyclic carbonates of glycols, ethylene cyanhydrin, nitroethanol, and m- and p-nitrophenol. Examples of compounds without such solvent or swelling action are water, methanol, ethanol, ether and chloroform. These additional compounds, if used at all, are preferably present in relatively small amounts; thus they may make up for example not more than 20%, and preferably not more than 12%, of the solvent mixture.

When the compositions comprising acrylonitrile polymers and nitrosamines are to be used for the production of one- or two-dimensional shaped articles such as fibres or films by extrusion or casting methods, it is preferable that the viscosity of the polyacrylonitrile or other acrylonitrile polymer (measured in 1% solution in dimethyl formamide at 20° C.), should be between about 2.5 and 4 centistokes, and especially between about 3 and 3.5 centistokes.

The compositions of the invention may be used for the production of shaped articles such as fibres and films either by wet-spinning methods, i. e. methods in which the composition is extruded or cast into a coagulating liquid which dissolves out the nitrosamine, or, especially when the nitrosamine has a high melting point and is stable at high temperatures, e. g. at 200° C., by melt-spinning methods, i. e. methods in which the composition is shaped at an elevated temperature and set by cooling, after which the nitrosamine may be removed for example by washing. In compositions which are to be used for wet-spinning, the concentration of the polymer is preferably between 5% and 25%, and especially 7.5%–20%, concentrations of 10%–15% or 20% being particularly useful. In compositions which are to be melt spun the concentration of the polymer may be much higher, for example above 50%, e. g. between about 50% and 85% and especially about 60%–75%. (All concentrations are by weight.)

In wet spinning methods, particularly good results are obtained by using as the coagulating liquid a carboxylic acid ester of boiling point above 250° C., especially a dialkyl phthalate, as described in U. S. patent application S. No. 257,198, filed November 19, 1951, of J. Downing and J. G. N. Drewitt. Other coagulating liquids may however be used if desired, including aromatic hydrocarbons as described in U. S. patent application S. No. 246,718, filed September 14, 1951, of A. Hodge, J. Downing, and J. G. N. Drewitt. The spinning solution and coagulating liquid are preferably at a temperature between about 80° and 150° C., and especially at about 90°–120° C. Articles made by melt spinning methods may be washed free from the nitrosamine for example by means of water, an alcohol, an ether, or a halogenated aliphatic hydrocarbon such as chloroform, the best agent to use in any particular case depending on the solubility properties of the nitrosamine.

Fibres made in accordance with the invention are preferably orientated by stretching in order to increase their tenacity. A certain degree of stretch may be imparted to the fibres in the course of the spinning operation, but whether this is done or not, the fibres are preferably stretched by several times, e. g. by 5–15 times, their length in a subsequent operation. For example wet-spun fibres, after leaving the coagulating bath, may be wound up and washed, e. g. in the form of multi-filament yarns, and then stretched while heated; for instance they may be stretched in hot air, wet steam or water at a temperature above 80° C. as described in U. S. patent application S. No. 127,256 filed November 14, 1949 of E. B. Johnson and J. Downing, now abandoned or while they are passed in contact with a hot metal surface, e. g. the surface of a plate or roller kept at about 150°–220° C. To obtain a yarn of the highest tenacity it is advantageous to stretch the fibers as soon as possible after coagulation is complete; for example they may be stretched continuously with their formation, if desired after an intermediate wash, e. g. with ether or a hydrocarbon such as benzene. If the separate filaments in a multifilament yarn show any tendency to stick together or coalesce during the stretching operation, this can generally be prevented by passing the yarn through an aqueous oil emulsion or otherwise applying an aqueous oil emulsion to the yarn before it is heated and stretched, or by carrying out the stretching operation in an aqueous oil emulsion at an elevated temperature, especially at a temperature above 80° C., as described in U. S. patent application S. No. 127,256 filed November 14, 1949 of E. B. Johnson and J. Downing, now abandoned. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

The invention is illustrated by the following examples.

*Example I*

14 parts by weight of a polyacrylonitrile of viscosity (in 1% solution in dimethyl formamide at 20° C.) 3.3 centistokes was added to 86 parts by weight of N-nitrosomorpholine, and the mixture heated to 120° C. and stirred until a clear solution had been formed. This solution was extruded at a temperature of 110° C. through a multi-hole spinning jet into a bath of dibutyl phthalate also at 110° C.; the yarn formed was at once stretched, while still wet with the dibutyl phthalate, to 7 times its original length while passing over a metal plate heated to 200° C. The stretched yarn was then heated to 180° C. while free to shrink. The resulting yarn had good tenacity and extensibility.

*Example II*

A polyacrylonitrile of viscosity (in 1% dimethyl formamide solution at 20° C.) 3.3 centistokes was milled with half its weight of NN'-dinitroso-piperazine at a temperature of about 165° C. until a homogeneous composition had been obtained. This composition was extruded at about 180° C. through a multi-hole spinning jet, and the filaments formed, while they still contained the dinitroso-piperazine, were stretched at about 120° C. by 6 times their length. The stretched filaments were then washed with hot aqueous ethanol until free from the dinitroso-piperazine.

While solutions made in accordance with the invention are of particular value in the production of fibres and films and other one- and two-dimensional shaped articles by extrusion or casting methods, they may also be employed for other purposes, e. g. for the production of coatings from acrylonitrile polymers.

Having described our invention, what we desire to secure by Letters Patent is:

Homogeneous compositions comprising a polymer selected from the group which consists of polyacrylonitrile and copolymers of acrylonitrile with another vinyl compound in which the acrylonitrile preponderates, and 25 to 40% by weight of NN'-dinitrosopiperazine.

References Cited in the file of this patent

FOREIGN PATENTS

| Number | Country | Date |
|---|---|---|
| 905,695 | France | Dec. 11, 1945 |